ed May 17, 1966

3,251,841
CHLORO-THIABICYCLO-ALKANE DIOXIDES AND PROCESS FOR THEIR PREPARATION
Leo A. Paquette, Portage Township, Kalamazoo County, Mich., assignor to The Upjohn Company, Kalamazoo, Mich., a corporation of Delaware
No Drawing. Filed Sept. 6, 1963, Ser. No. 306,995
6 Claims. (Cl. 260—247.1)

This invention relates to novel compositions of matter and to methods for their preparation. In particular, this invention relates to novel chlorothiabicycloalkane dioxides of the formula:

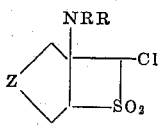

wherein RRN— is selected from the group consisting of the heterocyclic moieties, aziridinyl, azetidinyl, pyrrolidinyl, piperidino, hexahydroazepinyl, heptamethylenimino, octamethylenimino, morpholino, and thiomorpholino, each of said heterocyclic moieties having attached as substituents on carbon atoms thereof zero to 3 loweralkyls, inclusive, and Z is selected from the group consisting of —(CH$_2$)$_n$— where $n$ is 1 to 3, inclusive, and

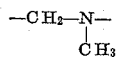

When RRN— is a heterocyclic moiety with 2 or more alkyls, the alkyls can be the same or different.

Examples of loweralkyl are methyl, ethyl, propyl, butyl, pentyl, hexyl, heptyl, and octyl, and isomeric forms thereof. Examples of heterocyclic moieties within the scope of RRN— are aziridinyl, 2-methylaziridinyl, 2 - ethylaziridinyl, 2 - butylaziridinyl, 2,3 - dimethylaziridinyl, 2,2 - dimethylaziridinyl, azetidinyl, 2 - methylazetidinyl, 3-methylazetidinyl, 2-octylazetidinyl, 2,2-dimethylazetidinyl, 3,3-diethylazetidinyl, 2,4,4-trimethylazetidinyl, 2,3,4-trimethylazetidinyl, pyrrolidinyl, 2-methylpyrrolidinyl, 3-butylpyrrolidinyl, 2-isohexylpyrrolidinyl, 2,3-dimethylpyrrolidinyl, 2,2-dimethylpyrrolidinyl, 2,5-diethylpyrrolidinyl, 3-tert-butylpyrrolidinyl, 2,3,5-trimethylpyrrolidinyl, 3,4-dioctylpyrrolidinyl, piperidino, 2-methylpiperidino, 3-methylpiperidino, 4-methylpiperidino, 3-isopropylpiperidino, 4-tert-butylpiperidino, 2-methyl-5-ethylpiperidino, 3,5-dipentylpiperidino, 2,4,6-trimethylpiperidino, 2,6-dimethyl-4-octylpiperidino, 2,3,5-triethylpiperidino, hexahydroazepinyl, 2-ethylhexahydroazepinyl, 4-tert-butylhexahydroazepinyl, 3-heptylhexahydroazepinyl, 2,4-dimethylhexahydroazepinyl, 3,3-dimethylhexahydroazepinyl, 2,4,6-tripropylhexahydroazepinyl, heptamethylenimino, 2-methylheptamethylenimino, 5-butylheptamethylenimino, 2,4 - diisopropylheptamethylenimino, 3,3 - diethylheptamethylenimino, 2,5,8 - trimethylheptamethylenimino, octamethylenimino, 3 - methyloctamethylenimino, 2,9-diethyloctamethylenimino, 4-isoöctyloctamethylenimino, morpholino, 2-ethylmorpholino, 2-methyl-5-ethylmorpholino, 3,3 - dimethylmorpholino, 2,6 - di - tert-butylmorpholino, thiomorpholino, 3 - methylthiomorpholino, 2,2-diethylthiomorpholino, 2,6-dihexylthiomorpholino, and the like. In each of the above examples of heterocyclic moieties, the free valence, and hence the point of attachment to the bicyclic ring in Formula I, is on the heterocyclic nitrogen atom.

The novel chlorothiabicycloalkane dioxides of Formula I form N-oxides on oxidation with peroxides, e.g., hydrogen peroxide.

The novel chlorothiabicycloalkane dioxides of Formula I (free base or N-oxide free base form) exist either in the nonprotonated (free base) form or the protonated form depending upon the pH of the environment. They form stable protonates (acid addition salts) on neutralization with suitable acids, for example, hydrochloric, hydrobromic, sulfuric, phosphoric, nitric, perchloric, thiocyanic, fluosilicic, acetic, benzoic, salicylic, glycolic, succinic, nicotinic, tartaric, maleic, malic, lactic, methanesulfonic, and cyclohexanesulfamic acids, and the like. These acid addition salts are useful in upgrading the free bases. The corresponding free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The novel compounds of Formula I also form alkyl quaternary ammonium salts by reaction with an alkyl halide, for example, an alkyl chloride, bromide, or iodide, or by reaction with an alkyl nitrate, an alkali metal alkyl sulfate, a dialkyl sulfate, an alkyl arylsulfonate, and the like. The anion of the quaternary ammonium salt can be inorganic, for example, chloride, bromide, iodide, nitrate, sulfate, phosphate, and the like, or it can be organic, for example, methosulfate, p-toluenesulfonate, 1-naphthalenesulfonate, acetate, benzoate, salicylate, hydrocinnamate, succinate, lactate, or the like. Examples of alkyl are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and isomeric forms thereof.

The novel chlorothiabicycloalkane dioxides of Formula I, either in the free base or N-oxide free base form or as acid addition salts of the free base or N-oxide free base, for example, the hydrochloric acid addition salts, have anti-inflammatory activity as shown by the granuloma pouch technique in rats, and are useful in treating inflammatory conditions topically, locally, and systemically in mammals, e.g., man, cattle, horses, dogs, and cats, and in birds, e.g., poultry. Tests with animals have also shown these compounds to have central nervous system depressant effects, and the compounds are therefore useful for causing sedation.

The higher alkyl quaternary ammonium salts of the novel compounds of Formula I, for example, wherein the alkyl group is of 9 to 20 carbon atoms, inclusive, exhibit valuable surface-active and cation-active wetting and emulsifying properties, and also exhibit valuable bacteriostatic and bactericidal activity. These higher alkyl quaternary ammonium salts are useful as detergent-sanitizers and can be employed to sanitize equipment used in the processing and preparation of foods, for example, fruit, meat, milk, and the like.

The free base form and the acid addition salt form of compounds of Formula I are useful as intermediates in the preparation of said alkyl quaternary ammonium salts.

The thiocyanic acid addition salts of the chlorothiabicycloalkane dioxides of Formula I, free base or N-oxide free base, when condensed with formaldehyde, form resinous materials useful as pickling inhibitors according to U.S. Patents 2,425,320 and 2,606,155. The compounds of Formula I, free base or N-oxide free base, also form fluosilicic acid addition salts which are useful as mothproofing agents according to U.S. Patents 1,915,334 and 2,074,359.

The Formula I compounds of this invention, free base or N-oxide free base, also form salts with penicillins. These salts have solubility characteristics which cause them to be useful in the isolation and purification of penicillins, particular benzyl penicillin. Said salts can be formed either by neutralization of the free base form of a compound of Formula I with the free acid form of a penicillin, or by a metathetical exchange of the anion of an acid addition salt of a compound of Formula I, for example, the chloride ion of a hydrochloride with the anionic form of a penicillin.

The novel chlorothiabicycloalkane dioxides of Formula I can be prepared by reacting an enamine of the formula:

II wherein RRN— and Z are as given above, with chloromethanesulfonyl chloride. The reaction advantageously is carried out in an inert solvent, e.g., ether, tetrahydrofuran, dioxane, benzene, toluene, etc., in the presence of an acid-binding agent, e.g., basic tertiary amines, such as, dimethylaniline, trimethylamine, N-methylpyrrolidine, etc. The temperature advantageously is kept between about 20° C. and about 50° C. though higher or lower temperatures, say from about 0° C. to about 100° C., can be used.

The enamines of Formula I can be prepared by known procedures, e.g., by reacting a ketone of the formula:

III with a heterocyclic amine of the formula RRN—H (Z and RRN— being as given above) in the presence of an inert solvent and a catalytic amount of p-toluenesulfonic acid. See Stork et al., J. Am. Chem. Soc. 85, 207 (1963).

The following examples are illustrative of the process and products of the invention, but are not to be construed as limiting.

*Example 1.—8-chloro-1-morpholino-7-thiabicyclo-[4.2.0]octane-7,7-dioxide*

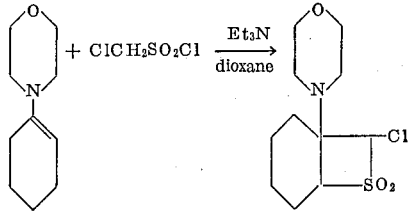

To a stirred solution of 33.4 g. (0.20 mole) of 1-morpholinocyclohexene and 20.2 g. (0.20 mole) of triethylamine in 150 ml. of dioxane was added dropwise a solution of 29.8 g. (0.20 mole) of chloromethanesulfonyl chloride in 25 ml. of dioxane with external cooling to maintain the temperature at 30° C. When the addition was completed, the mixture was allowed to stand overnight at about 25° C. The precipitated triethylamine hydrochloride was separated by filtration and washed well with ether. The combined filtrate and ether wash was evaporated under reduced pressure and the residue was chromatographed on basic alumina. Elution with ether-hexane (1:1) and evaporation of the eluate gave a colorless oil which was crystallized from aqueous ethanol. The precipitated white crystals were filtered and dried to afford 22.8 g. (40.8%) of 8-chloro-1-morpholino-7-thiabicyclo[4.2.0]octane - 7,7 - dioxide; M.P. 144–153° C. Two recrystallizations of this material from ethanol gave white blades; M.P. 155–157° C.

*Analysis.*—Calcd. for $C_{11}H_{18}ClNO_3S$: C, 47.22; H, 6.48; Cl, 12.67; N, 5.01; S, 11.46. Found: C, 47.18; H, 6.32; Cl, 12.79; N, 4.79; S, 11.61.

The 1-morpholinocyclohexene was prepared by reacting cyclohexanone and morpholine by the procedure of Stork et al., supra.

*Example 2.—7-chloro-1-morpholino-6-thiabicyclo-[3.2.0]heptane-6,6-dioxide*

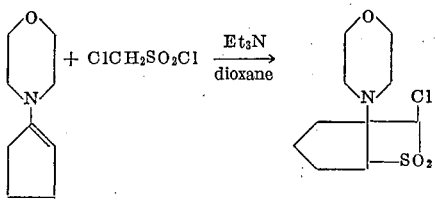

A solution of 30.6 g. (0.20 mole) of 1-morpholinocyclopentene and 20.2 g. (0.20 mole) of triethylamine in 150 ml. of dioxane was treated with 29.8 g. (0.20 mole) of chloromethanesulfonyl chloride as described in Example 1. Chromatography of the resulting dark oil on basic alumina and elution with ether-hexane (1:1) afforded a colorless oil which was crystallized with aqueous ethanol. There was obtained 19.7 g. (37.2%) of 7-chloro - 1 - morpholino - 6 - thiabicyclo[3.2.0]heptane-6,6-dioxide as a grey solid; M.P. 121–128° C. Two recrystallizations of this material from aqueous ethanol gave pure white platelets; M.P. 131–133° C.

*Analysis.*—Calcd. for $C_{10}H_{16}ClNO_3S$: C, 45.19; H, 6.07; N, 5.27; S, 12.07. Found: C, 45.23; H, 6.14; N, 5.14; S, 11.99.

The 1-morpholinocyclopentene was prepared by substituting cyclopentanone for cyclohexanone in Example 1.

*Example 3.—9-chloro-1-morpholino-8-thiabicyclo-[5.2.0]-nonane-8,8-dioxide*

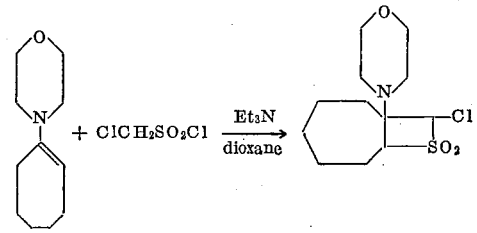

A solution of 36.2 (0.20 mole) of 1-morpholinocycloheptene and 20.2 g. (0.20 mole) of triethylamine in 150 ml. of dioxane was treated with 29.8 g. (0.20 mole) of chloromethanesulfonyl chloride as described in Example 1. Chromatography of the resulting pale yellow oil on basic alumina and elution with ether-hexane (1:1) afforded a pale yellow oil which was recrystallized from aqueous ethanol. There was obtained 20.6 g. (35.6%) of 9 - chloro - 1 - morpholino - 8 - thiabicyclo[5.2.0]nonane-8,8-dioxide as a white solid melting at 121–131° C. which on two recrystallizations from ethanol melted at 131–133° C.

*Analysis.*—Calcd. for $C_{12}H_{20}ClNO_3S$: C, 49.05; H, 6.86; N, 4.77; Cl, 12.07. Found: C, 48.96; H, 7.45; N, 4.50; Cl, 11.97.

The 1-morpholinocycloheptene was prepared by substituting cycloheptanone for cyclohexanone in Example 1.

*Example 4.—7-chloro-6-morpholino-3-methyl-8-thia-3-azabicyclo[4.2.0]octane-8,8-dioxide*

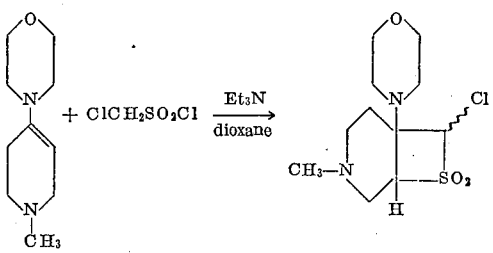

A solution of 36.4 g. (0.20 mole) of 1-methyl-4-morpholino-1,2,5,6-tetrahydropyridine and 20.2 g. (0.20 mole) of triethylamine in 150 ml. of dioxane was treated with 29.8 g. (0.20 mole) of chloromethanesulfonyl chloride as described in Example 1. After standing overnight, the mixture was diluted with 1.5 liters of water and made slightly basic with dilute aqueous sodium hydroxide solution. The mixture was extracted with methylene chloride and the organic phase was dried, filtered, and evaporated. The residual light brown oil was crystallized from ethanol-ether to give 10.0 g. of 7-chloro-6-morpholino-3-ethyl-8-thia-3-azabicyclo[4.2.0]octane-8,8-dioxide isomer A; M.P. 142–146° C. Pure isomer A was obtained as while needles by recrystallization from ethanol; M.P. 153–155° C. (dec.).

*Analysis.*—Calcd. for $C_{11}H_{19}ClN_2O_3S$: C, 44.81; H, 6.49; S, 10.88; Cl, 12.03. Found: C, 45.10; H, 6.46; S, 10.80; Cl, 12.26.

Concentration of the mother liquor from the above crystallization afforded 13.0 g. (total yield 23.0 g., 39.2%) of 7 - chloro-6-morpholino-3-methyl-8-thia-3-azabicyclo-[4.2.0]octane-8,8-dioxide isomer B; M.P. 147–149° C. Pure isomer B was obtained as white blades by recrystallization from ethanol; M.P. 149° C.

*Analysis.*—Found: C, 45.13; H, 6.99; S, 10.83; Cl, 12.40.

The 1-methyl-4-morpholino-1,2,5,6-tetrahydropyridine was prepared by substituting 1-methyl-4-piperidone for cyclohexanone in Example 1.

By substituting the morpholine in Examples 1 through 4 by aziridine,
2-methylaziridine,
2,3-dimethylaziridine,
2,2-dimethylaziridine,
azetidine,
2-methylazetidine,
3-methylazetidine,
2-octylazetidine,
2,2-dimethylazetidine,
3,3-dimethylazetidine,
2,4,4-trimethylazetidine,
pyrrolidine,
2-methylpyrrolidine,
3-butylpyrrolidine,
2-isohexylpyrrolidine,
2,3-dimethylpyrrolidine,
2,2,4-trimethylpyrrolidine,
2,2-dimethylpyrrolidine,
2,5-diethylpyrrolidine,
3-tert-butylpyrrolidine,
3,4-dioctylpyrrolidine,
piperidine,
2-methylpiperidine,
3-methylpiperidine,
4-methylpiperidine,
3-isopropylpiperidine,
4-tert-butylpiperidine,
2,4,6-trimethylpiperidine,
2-methyl-5-ethylpiperidine,
3,5-dipentylpiperidine,
2,6-dimethyl-4-octylpiperidine,
hexahydroazepine,
2-ethylhexahydroazepine,
4-tert-butylhexahydroazepine,
3,3-dimethylhexahydroazepine,
2,4,6-tripropylhexahydroazepine,
heptamethylenimine,
2-methylheptamethylenimine,
2,4-diisopropylheptamethylenimine,
3,3-dimethylheptamethylenimine,
octamethylenimine,
3-methyloctamethylenimine,
4-isoöctyloctamethylenimine,
2,2-diethylmorpholine,
2-methyl-5-ethylmorpholine,
3,3-dimethylmorpholine,
thiomorpholine,
3-methylthiomorpholine,
2,2-dipentylthiomorpholine,
there are obtained 8-chloro-1-X-7-thiabicyclo[4.2.0]octane - 7,7-dioxides, 7-chloro-1-X-6-thiabicyclo[3.2.0]heptane - 6,6 - dioxides, 9-chloro-1-X-8-thiabicyclo[5.2.0]nonane - 8,8 - dioxides, and 7-chloro-6-X-3-methyl-8-thia-3-azabicyclo[4.2.0]octane-8,8-dioxides wherein X is the radical obtained by removing the N-hydrogen from the cyclic amines given above.

I claim:

1. A compound selected from the group consisting of the free base, acid addition salt, N-oxide free base, N-oxide acid addition salt, and alkyl quaternary ammonium salt forms of a compound of the formula:

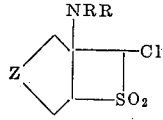

wherein RRN— is selected from the group consisting of the heterocyclic moieties, aziridinyl, azetidinyl, pyrrolidinyl, piperidino, hexahydroazepinyl, heptamethylenimino, octamethylenimino, morpholino, and thiomorpholino, each of said heterocyclic moieties having attached as substituents on carbon atoms thereof zero to 3 loweralkyls, inclusive, and Z is selected from the group consisting of —$(CH_2)_n$— where $n$ is 1 to 3, inclusive, and

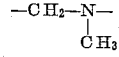

2. 8 - chloro - 1 - morpholino - 7 - thiabicyclo[4.2.0]octane-7,7-dioxide.

3. 7 - chloro - 1 - morpholino - 6 - thiabicyclo[3.2.0]heptane-6,6-dioxide.

4. 9 - chloro - 1 - morpholino - 8 - thiabicyclo[5.2.0]nonane-8,8-dioxide.

5. 7 - chloro - 6 - morpholino - 3 - methyl - 8 - thia-3-azabicyclo[4.2.0]octane-8,8-dioxide.

6. A process for making compounds according to claim 1 which comprises reacting chloromethanesulfonyl chloride with a compound of the formula:

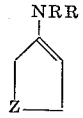

wherein RRN— and Z are as given in claim 1.

References Cited by the Examiner

Stork et al.: J. Am. Chem. Soc., vol. 84, p. 313 (1962).

HENRY R. JILES, *Acting Primary Examiner.*
JOSE TOVAR, *Assistant Examiner.*